United States Patent [19]

Fryer et al.

[11] 3,864,328

[45] Feb. 4, 1975

[54] 2-HYDRAZINO BENZODIAZEPINE DERIVATIVES

[75] Inventors: Rodney Ian Fryer, North Caldwell; Armin Walser, West Caldwell, both of N.J.

[73] Assignee: Hoffman-La Roche Inc., Nutley, N.J.

[22] Filed: Oct. 19, 1973

[21] Appl. No.: 408,245

[52] U.S. Cl. .................... 260/239 BD, 260/308 R
[51] Int. Cl. ..................... C07d 53/04, C07d 57/02
[58] Field of Search ............................. 260/239 BD

[56] References Cited
FOREIGN PATENTS OR APPLICATIONS
6,916,543   5/1970   Netherlands.................... 260/308 R

OTHER PUBLICATIONS

Meguro et al., Texrahedron Letters No. 47, pages 4,039–4,042 (1970).

*Primary Examiner*—Alton D. Rollins
*Attorney, Agent, or Firm*—Samuel L. Welt; Bernard S. Leon

[57] ABSTRACT

A process for preparing triazolobenzodiazepines via the condensation of the corresponding 2-hydrazinobenzodiazepine with an aliphatic dione, followed by cyclization of the open intermediate, is described. The products obtainable by this process are known compounds and are useful as sedative and tranquilizing agents.

2 Claims, No Drawings

2-HYDRAZINO BENZODIAZEPINE DERIVATIVES

DESCRIPTION OF THE INVENTION

The present invention relates to a process for preparing known and pharmacologically valuable triazolobenzodiazepines. More particularly the present invention is concerned with the preparation of 6-phenyl-4H-S-triazolo [4,3-a][—1,4—]benzodiazepines. The end products obtained in employing the inventive process are useful as sedative and tranquilizing agents.

Following the process of the present invention, one can prepare triazolobenzodiazepines of the formula

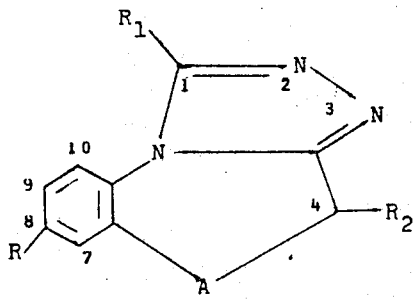

wherein
A is selected from the group consisting of

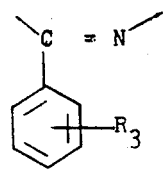 and 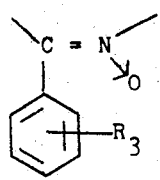

R is selected from the group consisting of hydrogen, halogen, nitro, trifluoromethyl, lower alkyl and lower alkoxy; $R_1$ signifies hydrogen or lower alkyl; $R_2$ signifies hydrogen or lower alkyl; and $R_3$ signifies hydrogen or halogen.

As used herein, the term "lower alkyl" either alone or in combination refers to straight and branched chain hydrocarbon groups containing from 1 to 7, preferably from 1–4, carbon atoms, such as, for example, methyl, ethyl, propyl, isopropyl, isobutyl, butyl and the like. The term "halogen" refers to all four forms thereof, i.e., bromine, chlorine, fluorine and iodine. The term "lower alkoxy" designates straight or branched chain saturated hydrocarbonoxy groups containing from 1 to 7 carbon atoms, preferably from from 1 to 4 carbon atoms such as methoxy, ethoxy, propoxy and the like.

In following the novel process of the present invention, the known and useful compounds of formula I above are prepared by condensing a 2-hydrazinobenzodiazepine of the formula

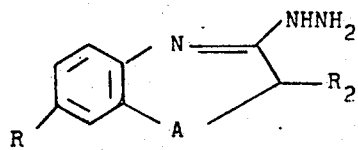

wherein A, R and $R_2$ are as described above
with an aliphatic dione, followed by cyclization of the resulting open hydrazone intermediate.

In a preferred aspect of the present invention, R in the starting material of formula II is halogen or nitro, $R_2$ is hydrogen, A is the group

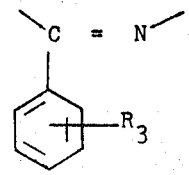

and $R_3$ is located in the ortho position of the 5-phenyl ring; so that by following the novel process of the present invention there is obtained a compound of the formula

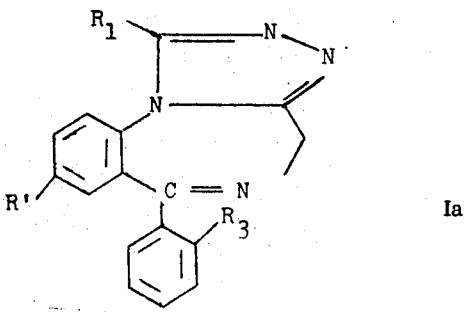

wherein
R' signifies halogen or nitro and
$R_1$ and $R_3$ are as described above.

In another preferred aspect, if the $R_1$ substituent is lower alkyl, it is preferably a methyl group; if the R substituent is halogen, chlorine is preferred, while if $R_3$ is halogen, chlorine or fluorine are preferred.

As discussed above, the compounds of formula I above are prepared by first condensing a 2-hydrazinobenzodiazepine of formula II above with an aliphatic dione of the formula

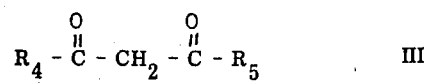

wherein $R_4$ and $R_5$ are individually hydrogen or lower alkyl, at least one of $R_4$ or $R_5$ being lower alkyl.

The reaction between the benzodiazepine of formula II and the dione of formula III results in a tautomeric mixture of the open hydrazone intermediate of the formula

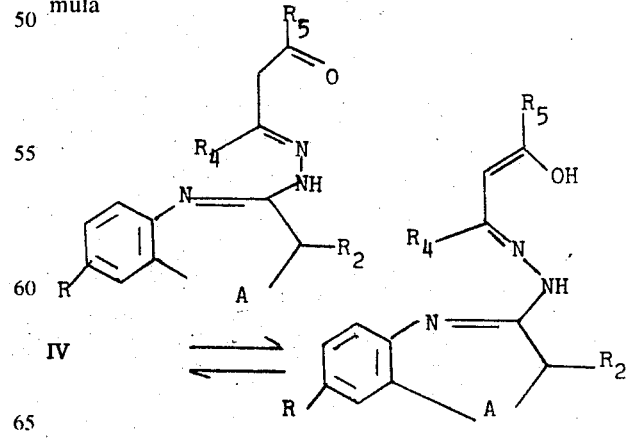

wherein R, $R_2$, $R_4$, $R_5$ and A are as described above.

It is expected that the ketone of formula IV and its enol form of formula IVa exist in equilibrium in the reaction medium in which the preparation thereof is effected. In the subsequent cyclization step described hereinafter, it is to be understood that a compound of formula IV and/or its enol form of formula IVa is the intermediate employed in the cyclization to the desired compound of formula I above.

It is obvious from the course of the reaction between the compounds of formula II and III above that upon cyclization of the tautomeric mixture of the compounds of formulae IV and IVa, the substituent that will be present in the 1-position of the product of formula I will correspond to the $R_4$ substituent in the formula III compound. Thus, if it is desired to prepare a compound of formula I unsubstituted in the 1-position, that is wherein $R_1$ signifies hydrogen, then the appropriate benzodiazepine of formula II is reacted with an α-formyl ketone, that is a compound of formula III wherein $R_4$ signifies hydrogen and $R_5$ signifies lower alkyl. This reagent can also exist in the enol form as shown by the following equilibrium equation:

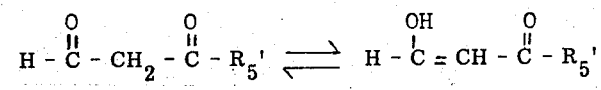

wherein $R_5'$ signifies lower alkyl.

Since the formyl portion of the α-formyl ketone is the more reactive site in the molecule, it is this site that will react with the hydrazino group, resulting, upon cyclization, in a compound of formula I herein $R_1$ is hydrogen. If the $R_4$ and $R_5$ groups in the compound of formula III are the same lower alkyl groups, then the condensation and cyclization reactions will result in a single triazolobenzodiazepine product. For example, if acetylacetone is employed as the dione of formula III, there is obtained a compound of formula I wherein $R_1$ signifies methyl. If 3,5-heptane dione is used, the resulting triazolo derivative bears an ethyl group as the $R_1$ substituent. In the case where $R_4$ and $R_5$ are different lower alkyl groups, for example where 2,4-hexanedione is employed, the process will result in a mixture of two triazolo derivatives bearing different lower alkyl groups as the $R_1$ substituent. These compounds can, of course, be separated following conventional techniques.

It should be understood that in preparing the triazolobenzodiazepine end product, it is not necessary to isolate the hydrazone intermediate. If the reaction mixture of the condensation is heated, preferably at reflux, cyclization will occur in situ.

The starting materials of formula II above are known compounds. The intermediates of formula IV and IVa are novel and as such form a part of the present invention.

The following examples are illustrative but not limitative of the present invention. All temperatures are given in degrees centigrade.

EXAMPLE 1

Preparation of 7-Chloro-2-[2-(3-hydroxy-1-methyl-2-butenylidene)hydrazo]-5-phenyl-3H-1,4-benzodiazepine 4-oxide A mixture of 15g (0.05 mol) of 7-chloro-2-hydrazino-5-phenyl-3H-1,4-benzodiazepine 4-oxide, 20g (0.2 mol) of acetylacetone and 400 ml of methanol was warmed until solution was complete. After sitting over night at room temperature, condensation resulted in a tautomeric mixture of 7-chloro-2-[2-(3-hydroxy-1-methyl-2-butenylidene)hydrazo]-5-phenyl-3H-1,4-benzodiazepine 4-oxide and 7-chloro-2-[2-(1-methyl-3-oxo-butylidene)hydrazo]5-phenyl-3H-1,4-benzodiazepine 4-oxide. The solvent was then removed under reduced pressure and the residue was crystallized from ether to give a yellow product. For analysis the product was purified by chromatography over silica gel using methylene chloride/ethylacetate, 1:1 (v/v). Crystallization from methylene chloride/ether gave the above named product as pale yellow crystals with mp 185°–186°.

EXAMPLE 2

Preparation of 8-Chloro-1-methyl-6-phenyl-4H-s-triazolo[4,5-a][1,4]benzodiazepine 5-oxide A mixture of 3,8g (0.01 mol) of 7-chloro-2-[2-(3-hydroxy-1-methyl-2-butenylidene)hydrazo]-5-phenyl-3H-1,4-benzodiazepine 4-oxide and 125 ml of xylene was refluxed for 16 hrs while 50 ml of solvent was distilled and collected in a Dean-Stark trap. The crystalline material separated upon cooling and collected to yield the above-named product with mp 278°–280° dec.

EXAMPLE 3

Preparation of 8-Chloro-1-methyl-6-phenyl-4H-s-triazolo[4,5-a][1,4]benzodiazepine 5-oxide A mixture of 3.8g (0.01 mol) of 7-chloro-2-[2-(3-hydroxy-1-methyl-2-butenylidene)hydrazo]-5-phenyl-3H-1,4-benzodiazepine 4-oxide, 100 ml of n-butanol and 1 ml of triethylamine was refluxed for 16 hrs. The crystals separated upon cooling and were collected to yield the above-named product with mp 278°–282° dec.

EXAMPLE 4

Preparation of 7-Chloro-2-[2-(3-hydroxy-1-methyl-2-butenylidene)hydrazo]-5-phenyl-3H-1,4-benzodiazepine A mixture of 2 g of 7-chloro-2-hydrazino-5-phenyl-3H-1,4-benzodiazepine, 20 ml of ethanol and 2 ml of acetylacetone was refluxed for 5 minutes to produce a tautomeric mixture of 7-chloro-2-[2-(3-hydroxy-1-methyl-2-butenylidene)hydrazo]-5-phenyl-3H-1,4-benzodiazepine and 7-chloro-2-[2-(1-methyl-3-oxobutylidene)hydrazo]-5-phenyl-3H-1,4-benzodiazepine. The residue obtained after evaporation of the solvent was crystallized from methylene chloride/ether/hexane to yield the aboved-named product which after recrystallization from 2-propanol showed a m.p. of 154°–157°.

EXAMPLE 5

Preparation of 8-Chloro-1-methyl-6-phenyl-4H-s-triazolo [4,5-a][1,4]benzodiazepine A mixture of 0.37 g of 7-chloro-2-[2-(3-hydroxy-1-methyl-2-butenylidene) hydrazo]-5-phenyl-3H-1,4-benzodiazepine, 0.3 ml of triethylamine and 20 ml of n-butanol was refluxed for 16 hrs. The solvents were removed under reduced pressure and the residue was crystallized from methylene chloride/ethylacetate/ether to yield the above named product with mp. 225°–226°.

EXAMPLE 6

Preparation of 8-Chloro-1-methyl-6-phenyl-4H-s-triazolo[4,5-a][1,4]benzodiazepine A mixture of 2.0 g of 7-chloro-2-hydrazino-5-phenyl-3H-1,4-benzodiazepine, 20 ml of n-butanol, 0.3 ml of triethylamine and 2 ml of acetylacetone was refluxed for 16 hours. The solvents were removed under reduced pressure and the residue was crystallized from methylene chloride/ethylacetate/ether to yield the above-named product, m.p. 225°–227°.

We claim:
1. A compound of the formula

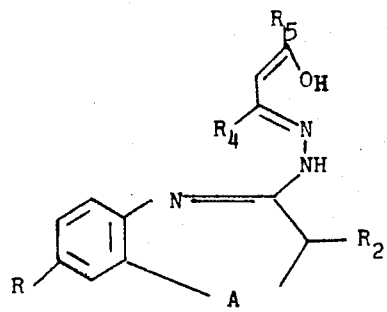

wherein
A is selected from the group consisting of

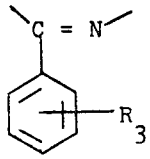 and 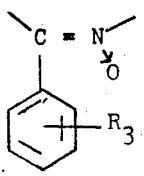 ;

R is selected from the group consisting of hydrogen, halogen, nitro, trifluoromethyl, lower alkyl, and lower alkoxy; $R_2$ signifies hydrogen or lower alkyl; $R_3$ signifies hydrogen or halogen; and $R_4$ and $R_5$ are individually hydrogen or lower alkyl, with at least one of $R_4$ and $R_5$ being lower alkyl.

2. A tautomeric mixture comprising the compounds of the formula

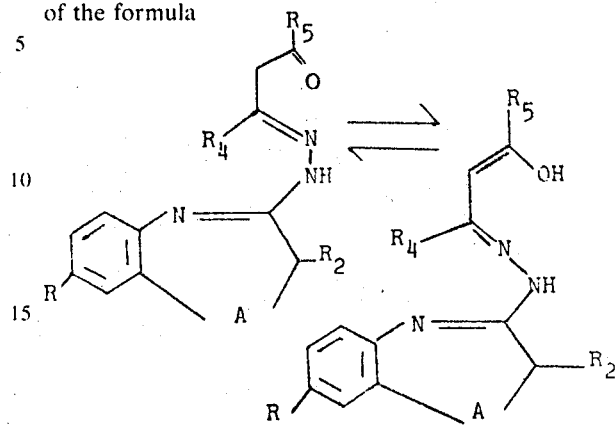

wherein
A is selected from the group consisting of

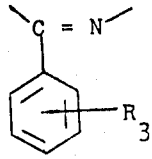 and 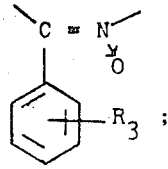 ;

R is selected from the group consisting of hydrogen, halogen, nitro, trifluoromethyl, lower alkyl, and lower alkoxy; $R_2$ signifies hydrogen or lower alkyl; $R_3$ signifies hydrogen or halogen; and $R_4$ and $R_5$ are individually hydrogen or lower alkyl with at least one of $R_4$ and $R_5$ being lower alkyl.

* * * * *